Patented May 23, 1944

2,349,571

UNITED STATES PATENT OFFICE 2,349,571

COATING COMPOSITION

Corliss F. Cummins, Midland, Mich., assignor to The Dow Chemical Company, Midland, Mich., a corporation of Michigan No Drawing. Application June 18, 1941,
Serial No. 398,641

4 Claims. (Cl. 260—17)

This invention relates to lacquer compositions and particularly to such compositions containing aluminum or bronze powder, and capable of retaining such powder suspended in leaf form on storage.

The leafing properties of aluminum and certain other metallic powders are well known. These properties have been utilized in making coating compositions, usually of a varnish type, comprising drying oils. No satisfactory, package-stable lacquer containing leafing metal powder and a cellulose derivative base has heretofore been made. Because of the tendency of the metal pigment to agglomerate and settle out from such lacquers, it has heretofore been necessary to mix the aluminum with the lacquer vehicle just shortly before use. It would be highly desirable, however, to use a lacquer rather than a paint or varnish, because of the shorter drying time and ease of application, if such a composition could be found which would be package-stable and retain its leafing power indefinitely.

Another objective which has not been attained through the use of lacquers described in the prior art is the provision of a cellulose derivative lacquer composition which may not only be deposited on glass, Cellophane, or solvent sensitive films such as those of ethyl cellulose or the vinyl resin films, but also which is capable of adhering well to any or all of the above suggested or other smooth surfaces. Some of the prior lacquers, of course, have been capable of adhering to one or more of the smooth surfaced articles above suggested but none of them have had the desired faculty of being universally applicable and adherent to all of the usual smooth surfaces upon which it may be desired to deposit a lacquer film.

It is an object of the present invention to provide a lacquer composition capable of depositing tough adherent coatings on all smooth surfaces. Another object is to provide an adherent lacquer for solvent-cast smooth surfaced films, which lacquer does not cause the films to curl when coated therewith. Yet another object is to provide a cellulose derivative lacquer pigmented with aluminum or other metallic leafing powder which is capable of being stored for long periods and still exhibit the desired leafing characteristics. A further object is to provide a cellulose ether lacquer pigmented with aluminum powder in which the pigment does not agglomerate on standing.

The foregoing and related objects may be attained according to the invention by providing a lacquer whereof the solvent consists of a hydrocarbon which is predominantly aromatic in character, and the solid or film forming component comprises from 15 to 50 per cent by weight of ethyl cellulose having an ethoxy content greater than 47.5 per cent and, correspondingly, 85 to 50 per cent by weight of a coumarone-indene resin compatible with the ethyl cellulose. The composition may contain, as well, up to 40 per cent of a plasticizer for the ethyl cellulose which is also compatible with the coumarone-indene resin, based on the weight of the ethyl cellulose and coumarone-indene resin.

The ethyl cellulose which may be employed in making up the composition is, as stated, one having an ethoxyl value greater than 47.5 per cent. For most lacquer purposes it should also be of a low viscosity type. Thus, it is preferred to use an ethyl cellulose whose 5 per cent solution in an 80–20 mixture of toluene and ethanol has a viscosity of from 5 to 20 centipoises. Such an ethyl cellulose is commonly indicated in the art to be, and will here be designated as, 5 to 20 centipoise ethyl cellulose. The lowest viscosity type of ethyl cellulose commercially available is the 7 centipoise type, although lower viscosity grades have been prepared and employed satisfactorily in the lacquers of the present invention.

The film-forming component of the new lacquers present in the largest amount is a coumarone-indene resin (or phenol modified coumarone-indene resin) which is completely compatible with the ethyl cellulose employed. By a completely compatible resin is meant one which, when mixed with the ethyl cellulose in any proportion, will form a clear solution in a hydrocarbon solvent for the cellulose ether. Some few coumarone-indene resins are not completely compatible with ethyl cellulose and such resins do not yield satisfactory aluminum lacquers when incorporated in the vehicle set forth in the above formulation. Many coumarone-indene resins, however, are available which are completely compatible with ethyl cellulose of the type defined. Among such suitable resins are those sold under the commercial names, "Nevillac Hard," "Neville R–27," "Nevillac R–15," "Cumar M. H. 1½," "Cumar P–10," and "Cumar M. S."

The mixture of coumarone-indene resin and ethyl cellulose forms the essential part of the solids of the lacquer composition of this invention. In order to adapt the composition to individual use requirements the properties of the coating may be modified by including in the lacquer up to 40 per cent by weight of a plasticizer or soft plasticizing resin compatible with the ethyl cellulose and coumarone-indene resin. Such a plasticizer alters the hardness, flexibility, or gloss of deposited films and adapts the composition to a variety of uses while retaining the properties of adhering well to smooth surfaces and of maintaining aluminum powder in suspension in leaf form. Among the wide variety of plasticizers which may be employed are the so-called chemical plasticizers such as tricresyl phosphate, dibutylphthalate, triphenyl phosphate, monophenyl di-ortho xenyl phosphate, butyl phthalyl butyl glycolate, diamyl naphthalene, ethyl toluene sulfonamide, and the like. Other plasticizers which may be used include castor oil, or its chemical derivatives available on the market for plasticizing purposes, such as butyl acetyl ricinoleate. Many of the soft, oil-modified alkyd resins or oil-modified phenolic resins may be employed, including those known commercially as "Beckolin," "Rezyl 1103," "Duraplex C-50-LV," "Bakelite X-R 13630," and the like, or soft coumarone-indene resins such as "Cumar P-10." The last named resin may be employed as a plasticizer when the principal amount of coumarone-indene resin present is another of the resins of that class previously named.

The solvent employed in the new lacquers is a hydrocarbon solvent having predominantly aromatic characteristics. Suitable solvents include toluene, xylene, isopropyl benzene, Solvesso Nos. 1, 2, or 3, Shell Solvent TS 11 or 16, Union Aromatic Solvent Nos. 8 or 30, and the like. The first three solvents named above are representative of a well known class of aromatic compounds; the remainder are industrial solvents made by the processing of petroleum distillates, all of them possessing a Kauri-butanol value greater than 50. Other characteristics of the commercial aromatic type of petroleum products, and those of a number of equivalent solvents to the ones named above, are listed in Gardner, "Paints, Varnishes, Lacquers, and Colors," 9th edition, 1939.

The following examples illustrate various lacquer formulations of the present invention, but are not to be construed as limiting the invention to the disclosed specific embodiments.

Example 1

Several lacquers were made containing the film forming solids and solvents designated in the following table, in the proportions specified. Samples of each of the lacquers were applied in clear, unpigmented form to smooth surfaces such as glass, ethyl cellulose foil, and the like, by spraying or brushing, as appeared appropriate from the viscosity of the solution. Other portions of the lacquers were pigmented with aluminum powder, which was stirred into the lacquer. The pigmented lacquers were set aside in closed vessels for several weeks and were all found to retain the aluminum in suspension in leaf form throughout the storage period. The deposited lacquer coatings all adhered well and permanently to all the smooth surfaces on which they were applied. The aluminum lacquers showed the property of spreading the leaf aluminum particles uniformly over the surfaces to which they were applied, and the aluminum particles were retained in the film showing no appreciable tendency to powder or to rub off from the coated surfaces.

*Note.*—In the table, the numerals opposite the items listed under A indicate the per cent of A represented by the designated ingredients; the numerals opposite the items under B represent the weight of B expressed as a percentage of the total weight of ingredients A; and, the numerals opposite the items under C indicate the percentage of C represented by each solvent present.

Table

| | Composition No. | | | | | | | |
|---|---|---|---|---|---|---|---|---|
| | 1 | 2 | 3 | 4 | 5 | 6 | 7 | 8 |
| A. Film-forming solids ..... per cent of whole.. | 20 | 18.8 | 24 | 18.8 | 15 | 17.8 | 20 | 20 |
| Ethyl cellulose, 7 centipoise, 48.5% ethoxy | 40 | 33.3 | 37.5 | 33.3 | 33.3 | 28.6 | 25 | 37.5 |
| Cumar MS | 60 | | | | | | | |
| Cumar MH 1½ | | 66.7 | | | | | | |
| Nevillac hard | | | 62.5 | 66.7 | 66.7 | 71.4 | 75 | 62.5 |
| B. Plasticizers and plasticizing resins ..... per cent of whole.. | | 6.2 | 6 | 6.2 | 5 | 7.2 | 5 | 5 |
| Cumar P-10 | | 33.3 | | | | | | |
| Castor oil | | | 25 | | | 40 | | |
| Duraplex C-50-LV | | | | 33.3 | | | | |
| Beckolin | | | | | 33.3 | | | |
| Bakelite XR 13630 | | | | | | | 25 | |
| Mono-phenyl di-ortho xenyl phosphate | | | | | | | | 25 |
| C. Solvent ..... per cent of whole.. | 80 | 75 | 70 | 75 | 80 | 75 | 75 | 75 |
| Solvesso No. 1 | 100 | | | | | | | |
| Solvesso No. 2 | | | | 50 | 50 | | | |
| Union aromatic solvent No. 30 | | | | 50 | | | 50 | |
| Shell TS 11 | | 100 | | | 50 | | | |
| Isopropyl benzene | | | 50 | | | | | 50 |
| Xylene | | | 50 | | | 100 | 50 | 50 |
| D. Total of A, B, and C | 100 | 100 | 100 | 100 | 100 | 100 | 100 | 100 |

Example 2

A lacquer base was prepared by dissolving 8 parts by weight (20 per cent) of low viscosity, standard ethyl cellulose, 8 parts (20 per cent) of Neville R-27, and 24 parts (60 per cent) of Nevillac Hard in 60 parts by weight of Union Aromatic Solvent No. 30. To this viscous solution was added 24 parts by weight of aluminum powder. The pigmented lacquer was diluted with an additional 42 parts by weight of the same solvent, forming a leafing aluminum lacquer, particularly suited for use as a marking or writing fluid, capable of being applied, for example, by means of a steel pen, to tinplate, glass, ethyl cellulose sheeting, regenerated cellulose foil, and other smooth surfaces. The fluid composition was package-stable, i. e., the aluminum remained uniformly dispersed in leaf form on long standing.

Numerous other compositions, within the range of proportions above designated, have been prepared, with results similar to those described. Particular coumarone-indene resins, and plasticizers or soft plasticizing resins other than those specifically named may be employed. Bronzing powders other than those of aluminum have also been employed with the present lacquers, and the resulting compositions have been found to be package-stable.

I claim:

1. A package-stable bronzing lacquer, comprising, as the film-forming solids, from 15 to 50 per cent by weight of ethyl cellulose having an ethoxy content greater than 47.5 per cent and correspondingly from 85 to 50 per cent of a coumarone-indene resin compatible with the ethyl cellulose, and up to 40 per cent of a plasticizer for the ethyl cellulose which is also compatible with the coumarone-indene resin, based on the combined weights of ethyl cellulose and coumarone-indene resin dissolved in a hydrocarbon solvent predominantly aromatic in character and having a Kauri-butanol value over 50, and a pigment comprising a leafing metal powder.

2. A package-stable bronzing lacquer, comprising, as the film-forming solids, from 15 to 50 per cent by weight of ethyl cellulose having an ethoxy content greater than 47.5 per cent and correspondingly from 85 to 50 per cent of a coumarone-indene resin compatible with the ethyl cellulose, and up to 40 per cent of a plasticizer for the ethyl cellulose which is also compatible with the coumarone-indene resin, based on the combined weights of ethyl cellulose and coumarone-indene resin, dissolved in a hydrocarbon solvent predominantly aromatic in character and having a Kauri-butanol value over 50, and a pigment comprising aluminum powder.

3. A package-stable bronzing lacquer, comprising, as the film-forming solids, from 15 to 50 per cent by weight of ethyl cellulose having an ethoxy content greater than 47.5 per cent and of a viscosity type between 5 and 20 centipoises, and correspondingly from 85 to 50 per cent of a coumarone-indene resin compatible with the ethyl cellulose, and up to 40 per cent of a plasticizer for the ethyl cellulose which is also compatible with the coumarone-indene resin, based on the combined weights of ethyl cellulose and coumarone-indene resin dissolved in a hydrocarbon solvent predominantly aromatic in character and having a Kauri-butanol value over 50, and a pigment comprising a leafing metal powder.

4. A package-stable bronzing lacquer, comprising, as the film-forming solids from 15 to 50 per cent by weight of ethyl cellulose having an ethoxy content greater than 47.5 per cent and of a viscosity type between 5 and 20 centipoises and correspondingly from 85 to 50 per cent of a coumarone-indene resin compatible with the ethyl cellulose, and up to 40 per cent of a plasticizer for the ethyl cellulose which is also compatible with the coumarone-indene resin, based on the combined weights of ethyl cellulose and coumarone-indene resin dissolved in a hydrocarbon solvent predominantly aromatic in character and having a Kauri-butanol value over 50, and a pigment comprising aluminum powder.

CORLISS F. CUMMINS.